United States Patent [19]

Kindinger et al.

[11] Patent Number: 5,230,089
[45] Date of Patent: Jul. 20, 1993

[54] AUTOMATED VOICE OPERATED TRANSMITTER CONTROL

[75] Inventors: Peter A. Kindinger, Cary; James C. Knutsen, Palatine; Clinton D. Luckinbill; Robert G. Uskali, both of Hoffman Estates, all of Ill.

[73] Assignee: Motorola, Schaumburg, Ill.

[21] Appl. No.: 829,195

[22] Filed: Feb. 3, 1992

[51] Int. Cl.$^5$ .................. H04B 1/46; H04M 9/10
[52] U.S. Cl. ........................ 455/79; 455/89; 455/116; 379/389
[58] Field of Search ............ 455/79, 78, 116, 89; 379/389, 390, 406, 407, 409; 381/31-33, 59, 46-47, 110, 25, 68.6

[56] References Cited

U.S. PATENT DOCUMENTS

| | | | |
|---|---|---|---|
| 4,147,892 | 4/1979 | Miller | 379/389 |
| 4,691,348 | 9/1987 | Braathen | 379/389 |
| 4,741,018 | 4/1988 | Potratz et al. | 379/58 |
| 4,860,359 | 8/1989 | Eicher | 455/79 |
| 5,008,954 | 4/1991 | Oppendahl | 455/79 |
| 5,054,061 | 10/1991 | Yoshida | 379/389 |

Primary Examiner—Reinhard J. Eisenzopf
Assistant Examiner—Lisa Charouel
Attorney, Agent, or Firm—Charles W. Bethards; Donald B. Southard

[57] ABSTRACT

An automated voice operated transmitter control (VOX) arrangement devoid of any separate manual actuation requirement and adaptable to a dynamic acoustic environment is described. The VOX decides whether it should be operating, automatically selects a threshold condition (70) from a predetermined list according to a average acoustic signal level over a first time period, and provides a VOX PTT signal to activate a radio frequency transmitter (24) when the acoustic signal level, over a second time period that is less than the first time period and exceeds a debounce time (78), exceeds the threshold condition.

9 Claims, 2 Drawing Sheets

AUTOMATED VOICE OPERATED TRANSMITTER CONTROL

BACKGROUND OF THE INVENTION

This invention relates to control of radio frequency transmitters including but not limited to voice operated transmitter control (VOX).

The utility of a radio frequency transmitter often depends on a user being able to activate the transmitter, e.g. determine whether, it transmits. This may be accomplished with a "Push-to-Talk" (PTT) control often located on an associated transmitter housing or an acoustical transducer (the microphone). By actuating the PTT control a transmitter user can transmit to others and conversely, when released, the user may receive a transmission.

From time to time it may be desirable to provide transmit control in situations where the user does not always have a hand, foot, etc. available to activate the PTT control for each requisite transmission. One known solution is to provide a voice operated transmitter control (VOX) circuit that detects the presence of the user's voice and provides a VOX PTT to activate the transmitter. For various reasons practitioners have typically included manual controls with the VOX circuits.

A user actuated manual control may be included to enable the user to account for the fact that a specific VOX may not be compatible with the communications system or protocol on a particular operating frequency or that a VOX circuit may only provide acceptable performance with a headset, handset, or similar transducer configuration. In addition, the acoustic environment (level or other distribution of acoustic energy) often varies widely from one time to another or one location to another. This variation may force practitioners to include some form, often manual, of VOX sensitivity adjustment (conditions, audio level, time delays, etc., when VOX PTT will be provided) in order to provide an acceptable level of performance.

While these user adjustable controls may provide acceptable VOX performance, they often require valuable or nonexistent physical space and thus force the VOX circuits into an undesirable larger or separate physical package. Furthermore, the user will waste time while continually setting and resetting the manual controls to account for all the changing conditions.

To resolve the aforementioned needs and problems it is desirable to have an automatic VOX arrangement devoid of any additional manual actuation requirements which is adaptable to dynamic acoustical environments.

SUMMARY OF THE INVENTION

This invention addresses the aforementioned needs and problems by disclosing an automated voice operated transmitter control (VOX) arrangement that is devoid of any separate manual actuation requirement. The arrangement is operable with a headset transducer on a predetermined channel, adaptable to a dynamic acoustic environment, and includes a decision function for providing a VOX enable signal, automatically, when the headset transducer is coupled to the radio frequency transmitter, the operating channel is set to the predetermined channel, and no PTT signal is present. Also included is a processing function, responsive to said VOX enable signal, for processing a headset transducer signal to provide a threshold condition indicative of the headset transducer signal over a first time period and an activation signal indicative of the headset transducer signal over a second time period where the first time period is greater than the second time period and a comparison circuit, responsive to the processing function, for determining when the level signal satisfies the threshold condition to provide a VOX PTT signal for activating the radio frequency transmitter.

BRIEF DESCRIPTION OF THE DRAWINGS

The features of the present invention which are believed to be novel are set forth with particularity in the appended claims. The invention, itself, however together with further advantages thereof, may best be understood by reference to the accompanying drawings in which:

DESCRIPTION OF THE PREFERRED EMBODIMENT

Figure 1:
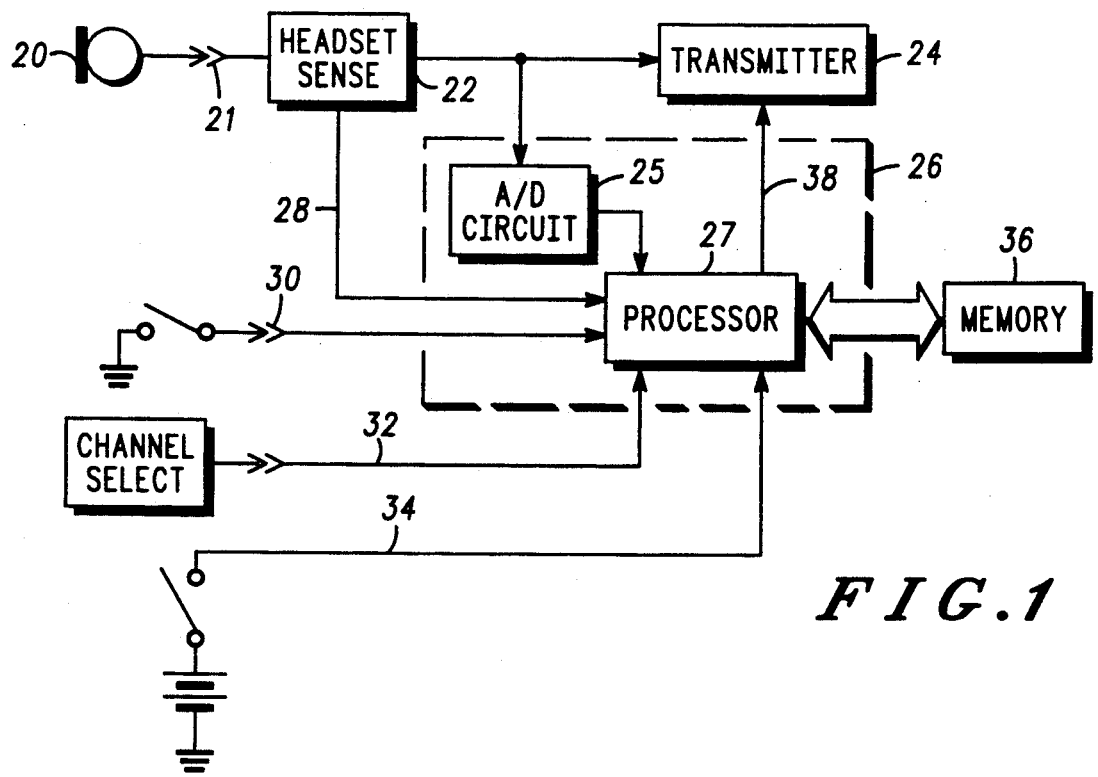
FIG. 1 is a block diagram of a voice operated transmitter control (VOX) arrangement constructed in accordance with the present invention.

Referring to FIG. 1, an acoustic transducer (20), for example a microphone cartridge associated with a headset, handset, or other VOX compatible assembly, is coupled to a headset sense circuit (22). The transducer (20) converts acoustic, sound, energy to an electrical signal to provide, for example a headset transducer signal (21), that is representative of the acoustic energy level at the transducer (20). The headset sense circuit (22) couples the headset transducer signal (21) to a radio frequency transmitter (24) for modulation of the RF carrier when the transmitter (24) is activated and to a analog to digital circuit (25), part of VOX circuit (26). Also the headset sense circuit (22) senses the presence of a VOX compatible transducer assembly, for example, a headset transducer and provides an indication of the same to a processor (27), part of VOX circuit (26), at input (28).

Other inputs coupled to processor (27) include a user actuated PTT signal (30) for activating the transmitter (24), a channel select (32) for setting a transmitter operating channel, a On/Off (34) for supplying the VOX circuit (26) and associated elements with power, and a memory (36) for storing various information needed by the VOX circuit (26), such as threshold levels, operating channel parameters including VOX compatibility per channel, and operating software.

As further described below, the VOX circuit (26) includes a decision function that utilizes processor (27) and its inputs to provide a VOX enable signal when all inputs, etc, indicate that VOX operation is appropriate. Responding to the VOX enable signal, analog to digital circuit (25) together with processor (27), representing a processing function, process the headset transducer signal (21) and, when appropriate, automatically provide a VOX PTT signal at output (38) for activating the radio frequency transmitter (24).

Figure 2:
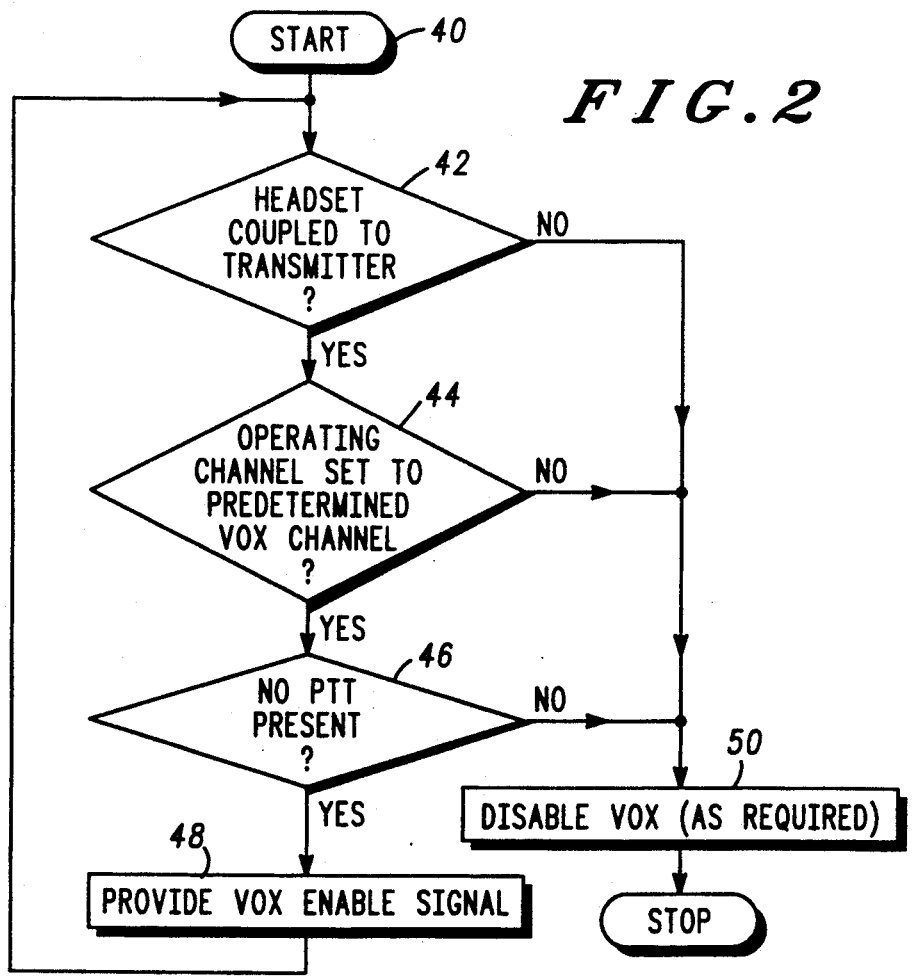
FIG. 2 is a flow diagram demonstrative of the FIG. 1 arrangement automatically determining whether VOX operation should be enabled.

In operation, whenever On/Off (34) is switched "On", or a headset presence is sensed at input (28), or the channel select (32) changes, the processor (27), acting as the decision function, will execute the decision flow chart of FIG. 2. Referring to FIG. 2 and starting at step (40), when processor (27), via the above inputs (28, 32 and 36, 30), verifies that a headset transducer (20) is coupled to transmitter (24) at step (42) and the operating channel is set to a predetermined (VOX compatible) channel at step (44) and no PTT signal (30) is present at step (46), a VOX enable signal is automatically provided at step (48). The VOX enable signal, in sum, indicates that VOX driven activation of the transmitter via output (38) may, dependent on further processing of the headset transducer signal described below, begin. When any of the steps (42, 44, 46) are not verified the respective path(s) labeled "no" are followed and the VOX circuit (26), when enabled, is disabled, at step (50).

Figure 3:
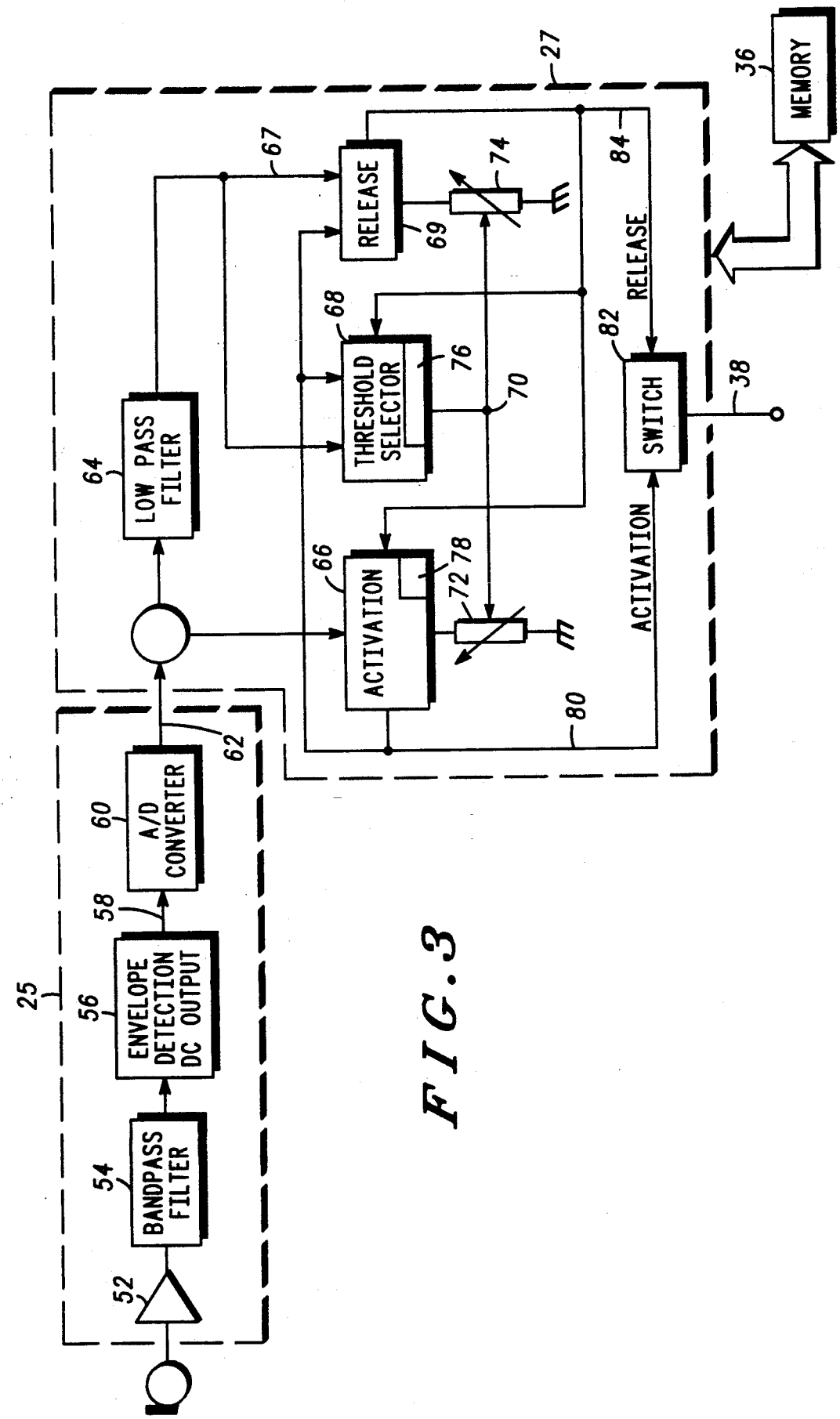
FIG. 3 is a block diagram illustrative of the FIG. 1 arrangement automatically adjusting VOX sensitivity and providing a VOX PTT signal.

Appreciation of processing the headset transducer signal (21) to provide a VOX PTT signal, in response to the VOX enable signal when appropriate, will be enhanced by referring to FIG. 3, where like reference numbers refer to like elements of FIG. 1, together with the following description. The headset transducer signal (21) is coupled by amplifier (52) and audio bandpass filter (54) to an envelope detector (56). The detector (56) is arranged to provide a DC output (58) indicative of the headset transducer signal (21) amplitude within a short time period, for example approximately 20 milliseconds after applying the transducer signal (21) and provide a slowly decaying output (RC time constant approximating 150 milliseconds) after removing the transducer signal (21). The DC output (58) signal is converted to a digital representation by A/D convertor (60) and coupled to processor (27) as an activation signal (62).

The processor (27) executes software to perform the remaining functions depicted in FIG. 3 per the description below. The activation signal (62) is coupled to low pass filter (64) and activation comparator (66). The low pass filter (64) couples a filtered, slowly varying, version (67) of the activation signal (62) to threshold selector (68) and a release comparator (69). The filtered version (67) is indicative of the headset transducer signal (21) amplitude, averaged over the previous approximately one half second. Responding to the VOX enable signal during an ensuing first time period, for example, approximately one (1) second, the threshold selector (68) selects a threshold condition (70) from a predetermined list of candidate conditions stored in memory (36).

Each candidate condition includes various parameters, such as activation level (72), release level (74), select level (76), and debounce time (78), that are indicative of various acoustical environments. The threshold selector (68) selects the threshold condition (70) by picking the candidate condition which has a select level (76) slightly larger than the filtered version (67) averaged over the first time period. When the threshold condition (70) is selected the activation level (72) and debounce time (78) are coupled to the activation comparator (66) and the release level (74) is coupled to the release comparator (69).

The activation comparator (66) now provides a switch close signal (80) when the activation signal (62) satisfies the activation level (72) over a second time period that is less than and subsequent to the first time period and exceeds the debounce time (78). The switch close signal (80) disables the threshold selector (68), enables the release comparator (69), and causes a switch function (82) to provide a VOX PTT signal at output (38). The release comparator (69), now enabled, provides a switch release signal (84), when the filtered version (67) satisfies the release level (74), that reenables the threshold selector (68) and the activation comparator (66), plus results in switch function (82) interrupting, discontinuing, the VOX PTT signal at output (38) which disables the transmitter (24). The threshold selector (68) may now modify the threshold condition (70), when appropriate, and the activation comparator (66) may again cause a VOX PTT signal, when appropriate.

The decision function depicted in FIG. 2 continues to operate such that a user may intervene at any time in the manner(s) indicated and thus disable the VOX circuit (26). The VOX arrangement, as described, is devoid of any separate manual control and is adaptable to dynamic acoustic environments thus providing a solution to the aforementioned needs.

What is claimed is:

1. An automated voice operated transmitter control (VOX) arrangement devoid of any separate manual actuation requirement, such arrangement being operable with a headset transducer on a predetermined channel and adaptable to a dynamic acoustic environment, comprising in combination:
    decision means for providing a VOX enable signal automatically when the headset transducer is coupled to a radio frequency transmitter, the operating channel is set to the predetermined channel, and no PTT signal is present;
    processing means, responsive to said VOX enable signal, for processing a headset transducer signal to provide a threshold condition indicative of said headset transducer signal over a first time period and an activation signal indicative of said headset transducer signal over a second time period where said first time period is greater than said second time period; and
    comparison means, responsive to said processing means, for determining when said activation signal satisfies said threshold condition to provide a VOX PTT signal for activating the radio frequency transmitter.

2. An automated VOX arrangement in accordance with claim 1 wherein said threshold condition includes an activation level, a debounce time period, a release level and a select level.

3. An automated VOX arrangement in accordance with claim 1 wherein said processing means includes a filter means for filtering said headset transducer signal to provide a filtered version indicative of a amplitude of said headset transducer signal.

4. An automated VOX arrangement in accordance with claim 3 wherein said processing means further includes a threshold selecting means, responsive to said filtered version, for selecting said threshold condition from a predetermined list of candidate thresholds that include a select level, said selecting said threshold condition being such that said filtered version over said first time period satisfies said select level.

5. An automated VOX arrangement in accordance with claim 4 wherein said threshold condition further includes an activation level, a debounce time period, and a release level.

6. An automated VOX arrangement in accordance with claim 5 wherein said comparison means includes a timing means, responsive to said activation signal and said activation level, for providing a VOX PTT signal when said activation signal satisfies said activation level for said debounce time period.

7. An automated VOX arrangement in accordance with claim 6 wherein said processing means further includes a release means, responsive to said filtered version, for deactivating said radio frequency transmitter when said filtered version satisfies said release level.

8. An automated VOX arrangement in accordance with claim 1 wherein said decision means includes disabling means for disabling VOX operation when the PTT signal is present and until the earlier occurrence of the operating channel being changed, the headset transducer being recoupled to the radio frequency transmitter, or a On/Off is switched "On".

9. In an automated voice operated transmitter control (VOX) arrangement devoid of any separate manual actuation requirement, such arrangement being operable with a headset transducer on a predetermined channel and adaptable to a dynamic acoustic environment, a method comprising the steps of:

providing a VOX enable signal automatically when the headset transducer is coupled to a radio frequency transmitter, the operating channel is set to the predetermined channel, and no PTT signal is present;

processing, responsive to said VOX enable signal, a headset transducer signal to provide a threshold condition indicative of said headset transducer signal over a first time period and an activation signal indicative of said headset transducer signal over a second time period where said first time period is greater than said second time period; and determining when said activation signal satisfies said threshold condition to provide a VOX PTT signal for activating the radio frequency transmitter.

* * * * *